April 10, 1934.                    J. W. GREIG                    1,954,078
                                AUTOMOBILE FRAME
                                Filed July 24, 1931

Inventor:
James W. Greig.
By Macleod, Calver, Copeland & Dike,
Attorneys.

Patented Apr. 10, 1934

1,954,078

UNITED STATES PATENT OFFICE 1,954,078

AUTOMOBILE FRAME

James W. Greig, Grosse Pointe Park, Mich., assignor to Hudson Motor Car Company, Detroit, Mich., a corporation of Michigan Application July 24, 1931, Serial No. 552,837

1 Claim. (Cl. 280—106)

This invention relates to frame construction in motor vehicles and more particularly to improvements in frame cross members. An object of the invention is to provide a cross member capable of satisfactorily strengthening the frame at its weakest point where it is curved or offset vertically, as, for example, at that raised portion of the frame, directly above the rear axle, known as the kick-up. This result is achieved by providing a cross member which is curved transversely, or longitudinally of the frame, to correspond to the curvature of the side members, and preferably of a breadth substantially corresponding to the length of the curved portions of the latter, being rigidly secured at its ends to said portions and bridging the same. By reason of its substantial breadth and transverse curvature, the cross member is strengthened against both compressive and torsional strains, thereby, when rigidly secured at its ends to the correspondingly curved longitudinal members, better maintaining the latter in rigid unitary relation and resisting the torsional strains to which motor vehicle frames are subjected by taking up any force exerted at the front side of the kick-up or other vertical curvature or offset, and distributing it through the kick-up to the longitudinal members or side rails in the rear thereof. In other words, by this construction of the cross member and the rigidity of the frame afforded thereby, the side rail is not permitted to act as a crank to twist the rail at its weakest point, (in front and rear of the kick-up) but any force exerted in either or both rails is prevented from being localized at the kick-up by the use of this cross member.

Other objects and advantages of my invention will be apparent from the following specification and drawing wherein Fig. 1 is a top plan view of a motor vehicle frame showing the cross members in position.

The invention is herein shown as applied to the kick-up portion of an otherwise conventional automobile frame. In Figs. 1 and 2, 10 and 11 represent the longitudinal members or side rails of the frame, 12 and 13 the front and rear axles respectively, and 14, 15, 16 and 18 are cross members of conventional design extending between the side rails and rigidly connected thereto. The side rails are preferably channel-shaped, and opening inwardly toward each other.

Figure 1:
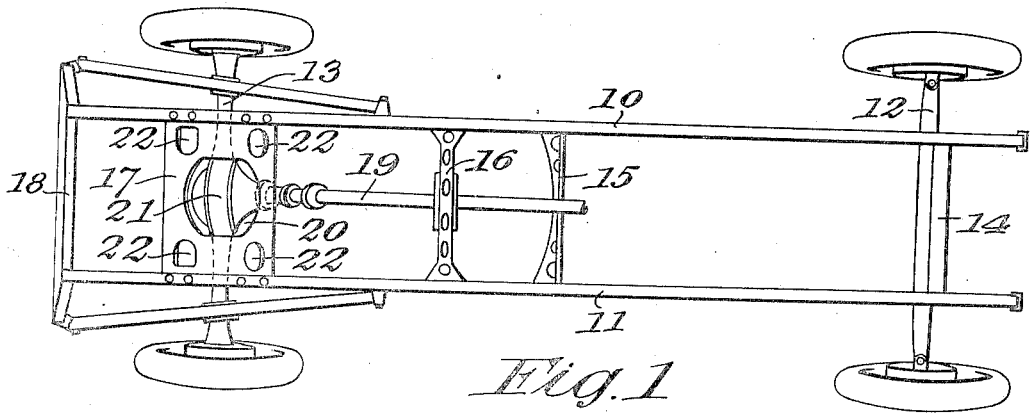
Figure 2:
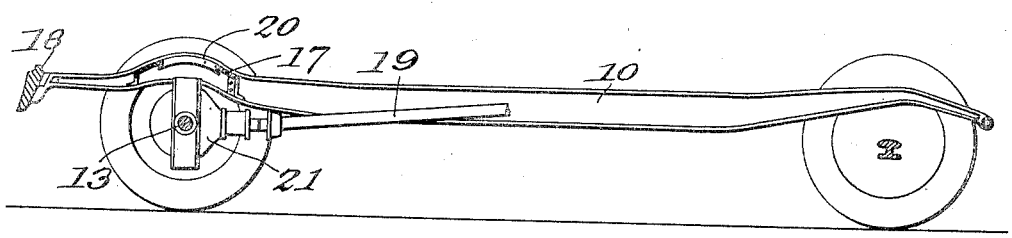
Fig. 2 is a longitudinal section of the same frame.
Figure 3:
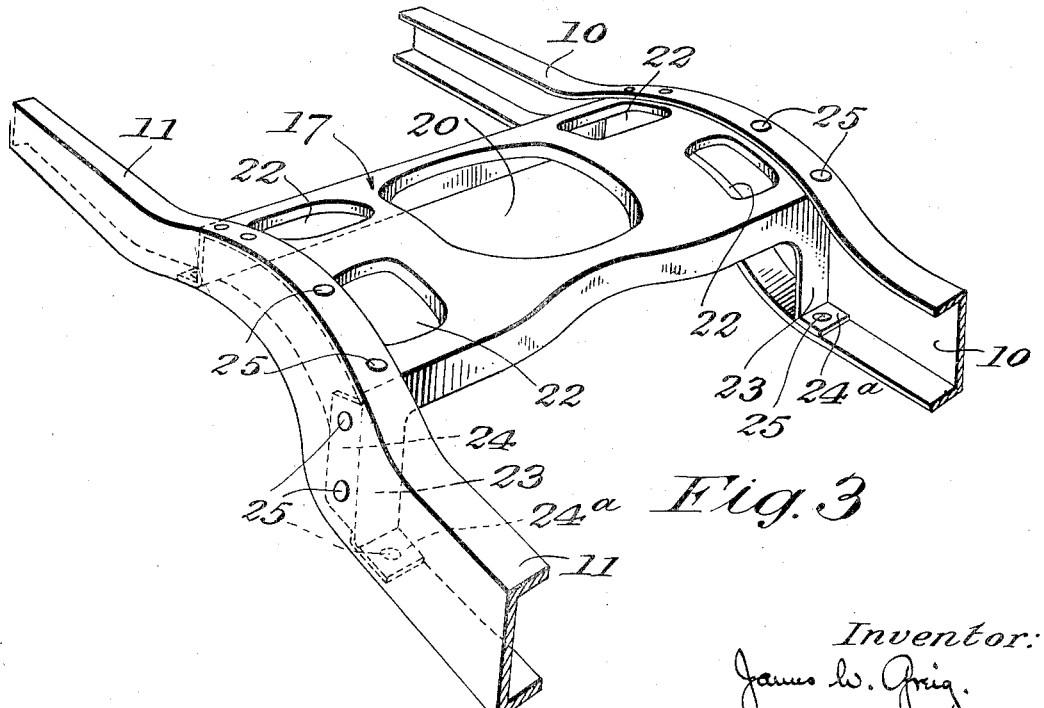
Fig. 3 is an enlarged detail perspective view of the cross member embodying my invention.

The cross member 17 is positioned in the kick-up above the rear axle 13, and rigidly secured to the channel side rails 10 and 11, and is of such breadth as to extend substantially throughout the length of the kick-up, thus bridging or spanning the kick-up from front to rear. The top portion of the cross member 17 is preferably convex or otherwise curved in shape longitudinally of the frame to conform to the shape of the kick-up, which is itself raised above the horizontal plane of the frame to provide greater clearance for the rear axle. Laterally of the frame, however, the top portion of cross member 17 is straight except for a portion of its front side which is preferably slightly bowed upwardly or convexed to provide clearance for the propeller shaft 19, as is more clearly shown in Fig. 3. An opening 20 is preferably provided in the cross member 17 to permit clearance for the differential casing 21, and holes 22 are preferably arranged as shown to lighten the weight of cross member 17. Flanges 23 depend downwardly along the front and rear sides of the cross member 17, with gussets 24 and 24a to allow the cross member to be suitably and securely fixed to the side rails 10 and 11, as by riveting or welding, rivets 25 being preferably driven through appropriate holes 26 provided in the gussets 24 and in the ends of the cross member 17, and through holes corresponding thereto in side bars 10 and 11. In the specific form of the invention shown, the ends of the cross bar 17 are riveted to the top flange of the side rails 10 and 11, the gussets 24 extending inwardly from the sides of the front flange 23 are riveted to the web of side rails 10 and 11, while gussets 24a extend laterally and outwardly from the ends of front and rear flanges 23 and are riveted to the bottom flange of side rails 10 and 11, thereby providing a box joint construction at the front and rear of the kick-up on each side rail. Such other gussets and holes may be provided for riveting as necessary. The rear side flange 23 preferably depends at uniform depth along the rear of said cross member 17, and the front side flange 23 is preferably cut out towards the center to provide clearance for the propeller shaft 19.

By making the cross member 17 of substantial breadth it will be seen that the torsional forces in the side rails are transmitted across the kick-up, rather than concentrated in the weak points in the front or rear of the kick-up. In addition any uniformity of the waves of vibration will be broken up and interfered with, for no node of vibration can occur at the point where the cross member 17 is attached. And by positioning the cross member above the rear axle, the frame is strengthened at the point where the stresses are greatest. The cross member is capable of economical large scale production for it can be cast or pressed out of sheet metal in one piece.

It is to be understood that the invention is not limited to the details of structure or the particular application disclosed, as it is apparent that various modifications may be made in the details of the invention, as well as in the application thereof, without in any way departing from the spirit of the invention as defined in the appended claim.

I claim:

In an automobile frame, in combination, a pair of channel-shaped longitudinal members having vertically curved portions constituting a kick-up, and a cross member curved transversely from front to rear to correspond to the curvature of the kick-up, of a breadth substantially corresponding to the length of the latter and centrally apertured to provide clearance for the differential casing, and secured at its ends to the upper flanges thereof, said cross member having at its front and rear edges depending flanges secured to the bottom flanges of the longitudinal members and gussets secured to the web portions of said members, said front flange being cut away at its center to provide clearance for the propeller shaft.

JAMES W. GREIG.